United States Patent
Hu et al.

(10) Patent No.: US 12,202,754 B2
(45) Date of Patent: Jan. 21, 2025

(54) POROUS BIOLOGICAL POLYMERIZING AGENT FOR SEDIMENT DEWATERING IN THE ENVIRONMENTAL DREDGING OF RIVERS AND LAKES, AND METHOD OF ITS PREPARATION AND USE

(71) Applicant: CCCC (TIANJIN) ECO-ENVIRONMENTAL PROTECTION DESIGN & RESEARCH INSTITUTE CO., LTD., Tianjin (CN)

(72) Inventors: Baoan Hu, Tianjin (CN); Jiayin Huang, Tianjin (CN); Xianfeng Dong, Tianjin (CN)

(73) Assignee: CCCC (TIANJIN) ECO-ENVIRONMENTAL PROTECTION DESIGN & RESEARCH INSTITUTE CO., LTD., Tianjin (CN)

( * ) Notice: Subject to any disclaimer, the term of this patent is extended or adjusted under 35 U.S.C. 154(b) by 218 days.

(21) Appl. No.: 17/639,913

(22) PCT Filed: Nov. 10, 2020

(86) PCT No.: PCT/CN2020/127806
§ 371 (c)(1),
(2) Date: Mar. 3, 2022

(87) PCT Pub. No.: WO2021/114997
PCT Pub. Date: Jun. 17, 2021

(65) Prior Publication Data
US 2022/0332621 A1    Oct. 20, 2022

(30) Foreign Application Priority Data

Dec. 12, 2019 (CN) .......................... 201911275664.8

(51) Int. Cl.
*C02F 11/147* (2019.01)
*C02F 11/02* (2006.01)
*C02F 11/128* (2019.01)
*C02F 103/00* (2006.01)

(52) U.S. Cl.
CPC ............ *C02F 11/147* (2019.01); *C02F 11/02* (2013.01); *C02F 11/128* (2013.01); *C02F 2103/007* (2013.01)

(58) Field of Classification Search
None
See application file for complete search history.

(56) References Cited

U.S. PATENT DOCUMENTS

| 2009/0272693 | A1* | 11/2009 | Mabille | C08L 1/02 |
| | | | | 210/683 |
| 2014/0124454 | A1* | 5/2014 | Nichols | C02F 1/5272 |
| | | | | 210/732 |

FOREIGN PATENT DOCUMENTS

| CN | 102010109 | A | | 4/2011 | |
| CN | 104860494 | A | * | 8/2015 | ............ C02F 11/02 |
| CN | 110372174 | A | * | 10/2019 | ............ C02F 11/02 |
| CN | 111018282 | A | | 4/2020 | |
| CN | 111018283 | A | | 4/2020 | |
| CN | 111217512 | A | | 6/2020 | |
| WO | 2009059163 | A1 | | 5/2009 | |

OTHER PUBLICATIONS

CN104860494 Zhang et al.—D and M for reduction treatment of sludge (Abstract & MT; Aug. 26, 2015; 18 pages) (Year: 2015).*
CN110372174 Zhu et al.—Sludge Conditioning Agent and Application Thereof (Abstract and MT; Oct. 25, 2019; 14 pages) (Year: 2019).*
Planting soil for greening, Ministry of Housing and Urban-Rural Development of the People's Republic of China, 2016, pp. 1-16.

* cited by examiner

*Primary Examiner* — Hayden Brewster
(74) *Attorney, Agent, or Firm* — Bayramoglu Law Offices LLC

(57) ABSTRACT

A porous biological polymerizing agent for sediment dewatering in environmental dredging of rivers and lakes is disclosed, which is obtained by thoroughly mixing 50 wt % to 70 wt % of an agent A and 30 wt % to 50 wt % of an agent B into irregular spheres of 1 mm to 3 mm, and crushing the irregular spheres into solid particles with a particle size of ≤20 mesh, and the solid particles have a pH of 5.0 to 6.0. The agent A is obtained by thoroughly mixing 10 wt % to 30 wt % of cellulose, 20 wt % to 50 wt % of starch, and 20 wt % to 40 wt % of amino acid; and the agent B is obtained by thoroughly mixing 40 wt % to 70 wt % of saccharifying enzyme (SE) and 30 wt % to 60 wt % of citric acid.

14 Claims, No Drawings

POROUS BIOLOGICAL POLYMERIZING AGENT FOR SEDIMENT DEWATERING IN THE ENVIRONMENTAL DREDGING OF RIVERS AND LAKES, AND METHOD OF ITS PREPARATION AND USE

CROSS REFERENCE TO THE RELATED APPLICATIONS

This application is the national phase entry of International Application No. PCT/CN2020/127806, filed on Nov. 10, 2020, which is based upon and claims priority to Chinese Patent Application No. 201911275664.8, filed on Dec. 12, 2019, the entire contents of which are incorporated herein by reference.

TECHNICAL FIELD

The present disclosure relates to the field of treatment of sediments of rivers and lakes, and in particular to a porous biological polymerizing agent for sediment dewatering in environmental dredging of rivers and lakes.

BACKGROUND

For the sediment dewatering in environmental dredging of rivers and lakes, organic flocculants such as polyacrylamide (PAM) or inorganic flocculants such as polyaluminium chloride (PAC) are usually used to achieve dewatering of mud-water separation, wherein organic flocculants are widely used due to low dosage and low cost.

However, due to the large variation in the mud concentration of environmental dredging, organic flocculants may be added at an excessive amount, which makes filtered water quite viscous. Moreover, if a large amount of organic flocculants exist in sediments for a long time, toxic and harmful substances will be produced, which is not conducive to transforming dewatered sediments into resources.

In summary, the addition of organic flocculants currently has a high risk of causing secondary pollution to dewatered sediments and residual water, which restricts the sustainable and healthy development of the environmental dredging industry for endogenous management of rivers and lakes.

SUMMARY

In order to solve the above problems in the prior art, the present disclosure provides a porous biological polymerizing agent for sediment dewatering in environmental dredging of rivers and lakes, which can not only rapidly separate mud and water, but also make separated mud and residual water meet environmental protection requirements.

For this reason, the present disclosure adopts the following technical solutions:

The present disclosure provides a porous biological polymerizing agent for sediment dewatering in environmental dredging of rivers and lakes, which can be used to treat inorganic salt-contaminated sediments of rivers and lakes. The porous biological polymerizing agent is obtained by thoroughly mixing 50 wt % to 70 wt % of an agent A and 30 wt % to 50 wt % of an agent B and forming a resulting mixture into irregular spheres, and the irregular spheres have a pH of 5.0 to 6.0. The agent A is obtained by thoroughly mixing 10 wt % to 30 wt % of cellulose, 20 wt % to 50 wt % of starch, and 20 wt % to 40 wt % of amino acid, and a sum of percentage contents of all components in the agent A is 100 wt %; and the agent B is obtained by thoroughly mixing 40 wt % to 70 wt % of saccharifying enzyme (SE) and 30 wt % to 60 wt % of citric acid.

Preferably, the agent A may be obtained by thoroughly mixing 15 wt % to 25 wt % of cellulose, 30 wt % to 50 wt % of starch, and 30 wt % to 40 wt % of amino acid, and a sum of percentage contents of all components in the agent A is 100 wt %.

More preferably, the agent A may be obtained by thoroughly mixing 25 wt % of cellulose, 40 wt % of starch, and 35 wt % of amino acid.

Preferably, the agent B may be obtained by thoroughly mixing 50 wt % to 70 wt % of SE and 30 wt % to 50 wt % of citric acid.

More preferably, the agent B may be obtained by thoroughly mixing 65 wt % of SE and 35 wt % of citric acid.

The irregular spheres may have a particle size of 1 mm to 3 mm. In order to facilitate the dissolution, the irregular spheres may be crushed into solid particles with a particle size of ≤20 mesh.

A method for using the porous biological polymerizing agent for sediment dewatering in environmental dredging of rivers and lakes described above is provided, wherein the porous biological polymerizing agent is prepared into an aqueous solution of 1 wt ‰ to 2 wt ‰, then the aqueous solution is fed into a pipeline delivering a sediment, and a resulting mixture, after being thoroughly mixed, is pumped through a pipeline pump to a geotextile bag, a mud storage yard, or another dewatering device for mud-water separation, wherein an amount of the porous biological polymerizing agent used accounts for 0.06‰ to 0.10‰ of a weight of the sediment to be treated.

When the polymerizing agent of the present disclosure is used to treat inorganic salt-contaminated sediments of rivers and lakes, the agent A and the agent B form irregular spheres with a porous structure during a preparation process, the irregular spheres are crushed and dissolved in water to form an aqueous solution, and the aqueous solution is added to a sediment, wherein residual water after the dewatering and flocculation of the sediment can form a microbial biofilm.

The present disclosure has the following beneficial effects.

1. Under the optimal dosage of the porous biological polymerizing agent, a mud-water separation speed is high, a specific resistance value can reach 4 to $6\times10^{10}$ m/kg, flocs are obvious, and a supernatant is clear.

2. Under the optimal dosage of the porous biological polymerizing agent, indexes such as chemical oxygen demand (COD), pH, and total phosphorus (TP) of residual water after the mud-water separation all meet the five standard levels of surface water or above, wherein the COD does not exceed 40 mg/L, the pH is 6.0 to 9.0, and the TP does not exceed 0.1 mg/L.

3. The residual water after the mud-water separation can form a microbial biofilm, which can provide water quality conditions for creating a healthy water ecosystem.

4. The mud obtained after the mud-water separation can meet the requirements of greening planting soil (CJ/T 340-2016) after being simply treated, realizing the comprehensive and sustainable utilization of sediments of rivers and lakes.

DETAILED DESCRIPTION OF THE EMBODIMENTS

The technical solutions of the present disclosure will be described in detail below with reference to specific examples.

The cellulose, starch, amino acid, SE, and citric acid used in the present disclosure are all solid particles.

A preparation method of the porous biological polymerizing agent for sediment dewatering in environmental dredging of rivers and lakes according to the present disclosure may be as follows:

1. Component preparation: the components in the agent A are thoroughly mixed according to a specified ratio; and the components in the agent B are thoroughly mixed according to a specified ratio;
2. Ball-milling: the agent A and the agent B are mixed and placed in a ball mill to form irregular spheres of about 1 mm to 3 mm, and a pH thereof is kept in a range of 5.0 to 6.0;
3. Crushing: the irregular spheres are crushed with a crusher into solid particles with a particle size of ≤20 mesh; and
4. Dispensing: the solid particles are dispensed into individual bags, ton bags, or filler bins.

Example 1

In a lake with an area of about 300 km$^2$, a water area to be treated was about 0.5 km$^2$, a sediment had a moisture content of about 60%, the contaminated sediment was silty clay, and contaminants were mainly nitrogen and phosphorus contaminants, wherein a nitrogen content was 4.4 mg/kg, a phosphorus content was 1,205 mg/kg, and an organic matter content was relatively high, with an average organic matter content of about 38.2 mg/kg. According to the measurement on the contaminated sediment by an adsorption-desorption test and an inflection-point method, the contaminated sediment in the lake had an average thickness of about 0.7 m, and thus a total amount of the contaminated sediment was preliminarily estimated as 110.55 million tons. According to the idea of staged treatment, about 105,000 tons of contaminated sediment in total needed to be dredged at this stage.

9 tons of the agent of the present disclosure were provided, with 5.8 tons of the agent A and 3.2 tons of the agent B. In the agent A, the cellulose had a mass percentage of 25%, the starch had a mass percentage of 40%, and the amino acid had a mass percentage of 35%; in the agent B, the SE had a mass percentage of 65% and the citric acid had a mass percentage of 35%.

The contaminated sediment was dredged by a cutter suction dredger and delivered through pipelines to a dewatering site. During the implementation of the project, the porous biological polymerizing agent was prepared by a powder-liquid stirring device into an aqueous solution according to a concentration of 1.1 wt ‰, and the prepared aqueous solution was fed through a three-way pipeline into a pipeline delivering the sediment. The porous biological polymerizing agent solution was thoroughly mixed with the sediment in the pipeline, then a resulting mixture was delivered to a geotextile bag in the dewatering site for dewatering.

During a dewatering process, water filtered out from the geotextile bag was clear, with a high output; with the continuous filtration of the bag body, water filtered out had no obvious odor and the bag body of the geotextile bag was not blocked; residual water gradually formed a microbial biofilm after being filtered through pebbles, wherein COD was about 15 mg/L, an ammonia nitrogen content was about 1.8 mg/L, TP was about 0.07 mg/L, and a pH of the residual water was about 7.6; and soil in the geotextile bag could be used to prepare greening planting soil.

Example 2

In a small shallow lake, a water area to be treated was about 0.1 km$^2$, a sediment had a moisture content of about 65%, the contaminated sediment was silty clay, and contaminants were mainly nitrogen and phosphorus contaminants, wherein a nitrogen content was 3.6 mg/kg, a phosphorus content was 1,178 mg/kg, and an organic matter content was relatively high, with an average organic matter content of about 26.9 mg/kg. The contaminated sediment was measured by an adsorption-desorption test and an inflection-point method, and it could be known that the contaminated sediment had an average thickness of about 0.5 m, and thus a total amount of the contaminated sediment was about 60,000 tons.

4.5 tons of the agent of the present disclosure were provided, with 2.9 tons of the agent A and 1.6 tons of the agent B. In the agent A, the cellulose had a mass percentage of 20%, the starch had a mass percentage of 50%, and the amino acid had a mass percentage of 30%; in the agent B, the SE had a mass percentage of 65% and the citric acid had a mass percentage of 35%.

The contaminated sediment was dredged by a mud pump and delivered through pipelines to a sediment pretreatment tank. The porous biological polymerizing agent was prepared by a powder-liquid stirring device into an aqueous solution according to a concentration of 1 wt ‰. The sediment in the pretreatment tank was pumped into a sediment concentration tank through a pump; a tee was arranged on a pumping pipeline, and the prepared agent aqueous solution was fed into the sediment delivery pipeline through the tee. The porous biological polymerizing agent solution and the sediment in the pipeline were thoroughly mixed, and a resulting mixture was delivered to the sediment concentration tank for mud-water separation; a concentrate obtained from the sediment concentration tank was pumped through a mud pump to a subsequent sediment plate-pressure-filtration dewatering unit for dewatering.

During the mud-water separation process, a mud-water separation interface in the sediment concentration tank was obvious, and a supernatant had no obvious odor, wherein COD was about 19 mg/L, an ammonia nitrogen content was about 1.9 mg/L, TP was about 0.08 mg/L, and a pH was about 7.8; after the concentration, the sediment had a solid content of 18%; after the plate pressure filtration, the sediment had a moisture content of 45%, and a mud cake had a thickness of 3 cm; the dewatered sediment could be used to prepare green planting soil.

What is claimed is:

1. A porous biological polymerizing agent for a sediment dewatering in an environmental dredging of rivers and lakes, wherein the porous biological polymerizing agent consists of irregular spheres obtained by thoroughly mixing 50 wt % to 70 wt % of a first agent and 30 wt % to 50 wt % of a second agent, and the irregular spheres have a pH of 5.0 to 6.0; the first agent is obtained by thoroughly mixing 10 wt % to 30 wt % of cellulose, 20 wt % to 50 wt % of starch, and 20 wt % to 40 wt % of an amino acid, and a sum of a weight percentage of the cellulose, a weight percentage of the starch, and a weight percentage of the amino acid in the first agent is 100 wt %; and the second agent is obtained by thoroughly mixing 40 wt % to 70 wt % of saccharifying enzyme (SE) and 30 wt % to 60 wt % of citric acid.

2. The porous biological polymerizing agent for the sediment dewatering in the environmental dredging of rivers and lakes according to claim 1, wherein the first agent is obtained by thoroughly mixing 15 wt % to 25 wt % of the cellulose, 30 wt % to 50 wt % of the starch, and 30 wt % to 40 wt % of the amino acid, and the sum of the weight percentage of the cellulose, the weight percentage of the starch, and the weight percentage of the amino acid in the first agent is 100 wt %.

3. The porous biological polymerizing agent for the sediment dewatering in the environmental dredging of rivers and lakes according to claim 2, wherein the first agent is obtained by thoroughly mixing 25 wt % of the cellulose, 40 wt % of the starch, and 35 wt % of the amino acid.

4. The porous biological polymerizing agent for the sediment dewatering in the environmental dredging of rivers and lakes according to claim 1, wherein the second agent is obtained by thoroughly mixing 50 wt % to 70 wt % of the SE and 30 wt % to 50 wt % of the citric acid.

5. The porous biological polymerizing agent for the sediment dewatering in the environmental dredging of rivers and lakes according to claim 4, wherein the second agent is obtained by thoroughly mixing 65 wt % of the SE and 35 wt % of the citric acid.

6. The porous biological polymerizing agent for the sediment dewatering in the environmental dredging of rivers and lakes according to claim 1, wherein the irregular spheres have a particle size of 1 mm to 3 mm.

7. The porous biological polymerizing agent for the sediment dewatering in the environmental dredging of rivers and lakes according to claim 6, wherein the irregular spheres are crushed into solid particles with a particle size of ≤20 mesh.

8. A method for using a porous biological polymerizing agent for sediment dewatering in the environmental dredging of rivers and lakes,
wherein the porous biological polymerizing agent consists of irregular spheres obtained by thoroughly mixing 50 wt % to 70 wt % of a first agent and 30 wt % to 50 wt % of a second agent, and the irregular spheres have a pH of 5.0 to 6.0;
the first agent is obtained by thoroughly mixing 10 wt % to 30 wt % of cellulose, 20 wt % to 50 wt % of starch, and 20 wt % to 40 wt % of an amino acid, and a sum of a weight percentage of the cellulose, a weight percentage of the starch, and a weight percentage of the amino acid in the first agent is 100 wt %; and
the second agent is obtained by thoroughly mixing 40 wt % to 70 wt % of saccharifying enzyme (SE) and 30 wt % to 60 wt % of citric acid,
the method comprising:
preparing the porous biological polymerizing agent into an aqueous solution of 1 wt % to 2 wt %, then feeding the aqueous solution into a pipeline delivering a sediment to obtain a mixture, and
thoroughly mixing and pumping the mixture through a pipeline pump to a geotextile bag, a mud storage yard, or a dewatering device for a mud-water separation,
wherein an amount of the porous biological polymerizing agent used accounts for 0.06‰ to 0.10‰ of a weight of the sediment to be treated.

9. The method for using the porous biological polymerizing agent for the sediment dewatering in the environmental dredging of rivers and lakes according to claim 8, wherein wherein the first agent is obtained by thoroughly mixing 15 wt % to 25 wt % of the cellulose, 30 wt % to 50 wt % of the starch, and 30 wt % to 40 wt % of the amino acid, and the sum of the weight percentage of the cellulose, the weight percentage of the starch, and the weight percentage of the amino acid in the first agent is 100 wt %.

10. The method for using the porous biological polymerizing agent for the sediment dewatering in the environmental dredging of rivers and lakes according to claim 9, wherein the first agent is obtained by thoroughly mixing 25 wt % of the cellulose, 40 wt % of the starch, and 35 wt % of the amino acid.

11. The method for using the porous biological polymerizing agent for the sediment dewatering in the environmental dredging of rivers and lakes according to claim 8, wherein the second agent is obtained by thoroughly mixing 50 wt % to 70 wt % of the SE and 30 wt % to 50 wt % of the citric acid.

12. The method for using the porous biological polymerizing agent for the sediment dewatering in the environmental dredging of rivers and lakes according to claim 11, wherein the second agent is obtained by thoroughly mixing 65 wt % of the SE and 35 wt % of the citric acid.

13. The method for using the porous biological polymerizing agent for the sediment dewatering in the environmental dredging of rivers and lakes according to claim 8, wherein the irregular spheres have a particle size of 1 mm to 3 mm.

14. The method for using the porous biological polymerizing agent for the sediment dewatering in the environmental dredging of rivers and lakes according to claim 13, wherein the irregular spheres are crushed into solid particles with a particle size of ≤20 mesh.

* * * * *